United States Patent
Hurlin

(10) Patent No.: US 11,753,992 B2
(45) Date of Patent: Sep. 12, 2023

(54) AIR INTAKE AND METHOD FOR DE-ICING AN AIR INTAKE OF A NACELLE OF AN AIRCRAFT JET ENGINE

(71) Applicant: SAFRAN NACELLES, Gonfreville-l'Orcher (FR)

(72) Inventor: Hervé Léopold Hurlin, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 155 days.

(21) Appl. No.: 17/299,479

(22) PCT Filed: Dec. 3, 2019

(86) PCT No.: PCT/EP2019/083371
§ 371 (c)(1),
(2) Date: Jun. 3, 2021

(87) PCT Pub. No.: WO2020/114988
PCT Pub. Date: Jun. 11, 2020

(65) Prior Publication Data
US 2022/0065164 A1      Mar. 3, 2022

(30) Foreign Application Priority Data

Dec. 4, 2018  (FR) ...................................... 1872268

(51) Int. Cl.
*F02C 7/045*     (2006.01)
*F02C 7/047*     (2006.01)
(52) U.S. Cl.
CPC ........ *F02C 7/047* (2013.01); *F05D 2220/323* (2013.01); *F05D 2260/20* (2013.01)
(58) Field of Classification Search
CPC .. F02C 7/04; F02C 7/045; F02C 7/047; F05D 2250/283; F05D 2260/96;
(Continued)

(56) References Cited

U.S. PATENT DOCUMENTS 2,668,596 A      2/1954   Elliott
3,933,327 A  *  1/1976   Cook ..................... B64D 15/04
                                                        244/134 B
(Continued)

FOREIGN PATENT DOCUMENTS

EP    1232945 A1   8/2002
FR    3023538 A1   1/2016

OTHER PUBLICATIONS

Search Report from the French Intellectual Property Office on corresponding FR application (FR1872268) dated Jul. 4, 2019.

(Continued)

*Primary Examiner* — Todd E Manahan
*Assistant Examiner* — Sean V Meiller
(74) *Attorney, Agent, or Firm* — KOS IP LAW LLP

(57) ABSTRACT

A de-icing device for an air intake of an aircraft jet engine nacelle extending along an axis in which a flow of air flows from upstream to downstream, the intake comprising an inner wall and an outer wall connected by a leading edge, the inner wall comprising a plurality of blowing lines, each blowing line comprising a plurality of through-openings configured to blow elementary streams from the hot air source in order to de-ice said inner wall, the blowing lines being parallel to one another in a cylindrical projection plane, each blowing line having a depth defined along the axis X and a length defined along the axis Y in the cylindrical projection plane, two adjacent blowing lines being spaced apart by a distance, the ratio of the distances L3/D3 being between 1 and 2.

11 Claims, 8 Drawing Sheets

(58) Field of Classification Search
CPC .... B64D 2033/0206; B64D 2033/0226; B64D 2033/0233; B64D 33/02; B64D 15/00; B64D 15/02; B64D 15/04
See application file for complete search history.

(56) References Cited

U.S. PATENT DOCUMENTS

| | | | | |
|---|---|---|---|---|
| 8,931,588 | B2* | 1/2015 | Murray | F02K 3/06 |
| | | | | 181/292 |
| 10,532,820 | B2* | 1/2020 | Caruel | B64D 33/02 |
| 10,961,913 | B2* | 3/2021 | Howarth | F02K 1/827 |
| 2017/0298821 | A1* | 10/2017 | Welch | F02C 7/24 |

OTHER PUBLICATIONS

International Search Report and Written Opinion on corresponding PCT application (PCT/EP2019/083371) from International Searching Authority (EPO) dated Jan. 29, 2020.

* cited by examiner

AIR INTAKE AND METHOD FOR DE-ICING AN AIR INTAKE OF A NACELLE OF AN AIRCRAFT JET ENGINE

TECHNICAL FIELD

The present invention relates to the field of aircraft turbojet engines and is more particularly directed to a device for de-icing an air intake of a nacelle of an aircraft turbojet engine.

BACKGROUND

In a known manner, an aircraft comprises one or more turbojet engines to allow its propulsion by acceleration of an air flow which circulates from upstream to downstream in the turbojet engine.

With reference to FIG. 1, a turbojet engine 100 extending along an axis X and comprising a fan 101 rotatably mounted about axis X in an external shell 102 in order to accelerate an air flow F from upstream to downstream is represented. Hereinafter, the terms upstream and downstream are defined with respect to the circulation of the air flow F. The turbojet engine 100 comprises at its upstream end an air intake 200 comprising an internal wall 201 pointing to axis X and an external wall 202 which is opposite to the internal wall 201, the walls 201, 202 are connected by a leading edge 203 also called an "air intake lip". Thus, the air intake 200 allows separation of the incoming air flow F into an internal air flow FINT guided by the internal wall 201 and an external air flow FEXT guided by the external wall 202. Hereinafter, the terms internal and external are defined radially with respect to axis X of the turbojet engine 100.

In a known way, during the flight of an aircraft, due to the temperature and pressure conditions, ice is likely to accumulate at the leading edge 203 and the internal wall 201 of the air intake 200 and to form ice blocks that are likely to be ingested by the turbojet engine 100. Such ingestions have to be avoided in order to improve the life of the turbojet engine 100 and reduce malfunctions.

To eliminate ice accumulation, with reference to FIG. 1, it is known to circulate a flow of hot air FAC through an internal cavity 204 formed between the interior wall 201 and the exterior wall 202 of the air intake 200. Such a circulation of hot air allows the internal wall 201 to be heated, by thermal conduction, and thus ice accumulation which melts as it accumulates to be avoided. Such a circulation of a hot air flow FAC remains complex given that the air intake 200 can also fulfill an acoustic function and can generally comprise a honeycomb structure on its internal wall 201. To this end, it has been suggested by patent application FR2912781 and patent application WO2015/071609 to provide channels for circulating a hot air flow in the honeycomb structure.

Incidentally, a de-icing device that has through openings in the internal and external wall to eject the hot air flow is also known. Such a technical solution is not retained because it consumes a lot of energy as the air is ejected in a punctual way and only achieves an imperfect de-icing.

An air intake internal wall comprising through openings, evenly distributed over the internal wall, in order to blow a hot air flow radially outwardly of the internal wall into the engine air stream is also known. In practice, the high number of through openings significantly increases the hot air consumption and is detrimental to the acoustic treatment. This is particularly problematic for a high bypass ratio turbojet engine with a large diameter air intake. In addition, the blowing efficiency is not optimal since several through openings are aligned in parallel to the axis of the turbojet engine, which lowers the heating efficiency upon circulating an incident air flow from upstream to downstream facing two through openings aligned in parallel to axis X due to pressure balances. The hot air consumption is thus high. Further, the surface located between two alignments of through openings is insufficiently heated, which affects the quality of de-icing. One purpose of the present invention is to enable the prevention of ice accumulation while allowing efficient and economical acoustic treatment.

In addition, another purpose is to provide an air intake that has the aforementioned advantages while being simple and inexpensive to manufacture.

SUMMARY

For this purpose, the invention relates to a de-icing device for a nacelle of an air intake of an aircraft turbojet engine extending along an axis X in which an air flow circulates from upstream to downstream, the air intake annularly extending about axis X and comprising an internal wall pointing to axis X and an external wall which is opposite to the internal wall, the walls being connected by a leading edge and a front internal partition wall so as to delimit an annular cavity, the de-icing device comprising at least one hot air source in the annular cavity.

The invention is remarkable in that the internal wall comprises a plurality of blowing lines, each blowing line comprising a plurality of through openings configured to blow elementary flows from the hot air source in order to de-ice said internal wall, the blowing lines being parallel to each other in a cylindrical projection plane defined with respect to axis X of the turbojet engine and to an axis Y defining the angular position with respect to axis X, each blowing line having a depth P3 defined along axis X and a length L3 defined along axis Y in the cylindrical projection plane, two adjacent blowing lines being spaced apart by a distance D3 along axis Y, the distance ratio L3/D3 being between 1 and 2.

Thus, unlike prior art, which provided for the blowing openings to be arranged in a distributed and homogeneous manner on the surface of the internal wall, the invention advantageously suggests to organize them in lines by spacing them so as to limit any excessive coverage or overlap. Advantageously, each line of current flowing from upstream to downstream on the internal wall comes into contact with at least one blowing line, which ensures effective de-icing. In addition, the distance ratio L3/D3 limits any excessive coverage, which limits the number of through openings for blowing. This makes de-icing more economical, which is advantageous for a high bypass ratio turbojet engine with a large diameter air intake.

Preferably, with each blowing line being spaced apart by a tilt angle θ with respect to axis X in the cylindrical projection plane, the tilt angle is between 20° and 70°. Such a tilt angle allows for a compromise between efficiency and economy. The smaller the tilt angle, the greater the number of blowing lines and the more effective the de-icing.

Preferably, each blowing line comprises at least 5 through openings, preferably at least 10 through openings, more preferably at least 15. A large number of through openings is optimal for a turbojet engine. Furthermore, it allows a distance ratio L3/D3 that is relevant for a turbojet engine to be defined.

Preferably, the through openings of the same blowing line are spaced apart by a first pitch Px along axis X. The through openings, at the same longitudinal position along axis X, are spaced apart by a second pitch Py along axis Y according to the following relationship: Py=Px*α with α a constant greater than 2, preferably 5, more preferably 10. Such pitches allow to emphasize that the through openings are not homogeneously distributed but organized along lines.

Preferably, the internal wall comprises at least one overlapping zone ZP of the blowing lines, the overlapping zone ZP comprising at least one upstream blowing line and one downstream blowing line. Thus, an overlap allows two blowing lines to act on the same angular portion of the air intake.

According to one aspect, the downstream blowing line does not comprise any through openings in the overlapping zone ZP. In other words, only the upstream blowing line comprises through openings in the overlapping zone ZP. This allows for downstream de-icing due to circulation of streamlines while limiting the number of through openings.

According to another aspect, the through openings are alternating along direction Y between the upstream blowing line and the downstream blowing line. Thus, it is advantageously avoided that a same streamline passes through two through openings of two different blowing lines, the performance of the de-icing being then not affected.

Preferably, the density of through openings is constant along direction Y. Thus, whether the blowing lines overlap or not, the same amount of hot air is delivered substantially peripherally. The presence of through openings for blowing at different positions along axis X allows for overall de-icing.

Preferably, the internal wall comprising at least one acoustic attenuation structure comprising a plurality of acoustic attenuation openings, the acoustic attenuation openings are distributed on the internal wall outside the blowing lines. Thus, the internal wall provides through openings for heating on the one hand, and openings for acoustic attenuation on the other hand. By virtue of the invention, the number of through openings dedicated to blowing is advantageously reduced, which allows the number of acoustic attenuation ports and, therefore, the acoustic performance to be maximized.

Preferably, the honeycomb structure defines, on the one hand, acoustic cells each comprising at least one acoustic attenuation port and, on the other hand, circulation channels forming the blowing lines and comprising the through openings for blowing. Thus, the blowing lines are in the form of hot air conduction channels through which openings are pierced in order to allow blowing. A blowing line thus allows, even in the absence of through openings, the internal wall to be heated by thermal conduction.

Preferably, each through opening has a cross-sectional area greater than 3 mm² in order to allow efficient blowing. Further preferably, two adjacent through openings in a blowing line are spaced apart by a distance defined along axis Y of between 1 and 2.5 times the diameter of a through opening. This prevents the formation of unheated internal wall portions between two consecutive through openings.

Preferably, each acoustic attenuation port has a diameter of less than 0.5 mm to allow for optimal attenuation.

The invention also relates to an air intake having a de-icing device as previously set forth. The invention also relates to a nacelle comprising an air intake as previously set forth. The invention also relates to a turbojet engine comprising a nacelle as previously set forth.

The invention further relates to a method for de-icing, by means of a de-icing device as previously set forth, an air intake of an aircraft turbojet engine nacelle extending along an axis X in which an air flow circulates from upstream to downstream, the air intake annularly extending about axis X and comprising an internal wall pointing to axis X and an external wall which is opposite to the internal wall, the method comprising a step of blowing a plurality of elementary flows from the hot air source through the through openings of the blowing lines so as to de-ice the internal wall.

BRIEF DESCRIPTION OF THE DRAWINGS

The invention will be better understood upon reading the following description, given only by way of example, and referring to the appended drawings given as non-limiting examples, in which identical references are given to similar objects and in which.

It should be noted that the figures set out the invention in detail to implement the invention, said figures of course being able to be used to better define the invention if necessary.

DETAILED DESCRIPTION

Figure 1:
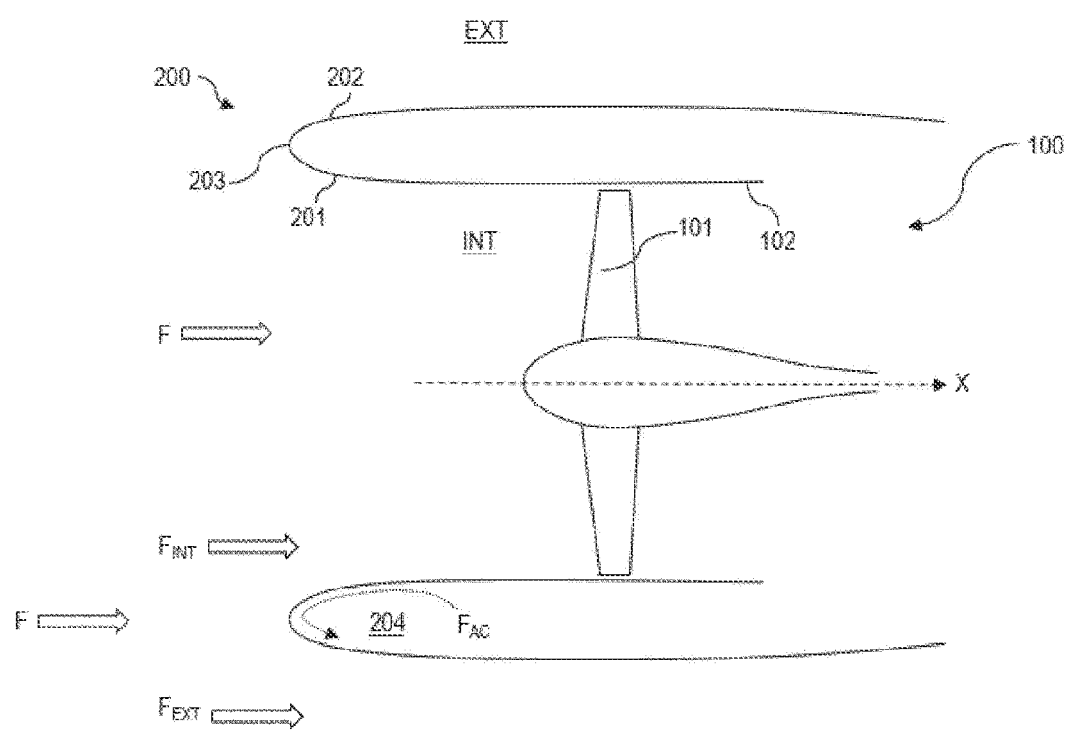
FIG. 1 is a schematic representation in a longitudinal cross-section view of an aircraft turbojet engine and air intake according to prior art.
Figure 2:
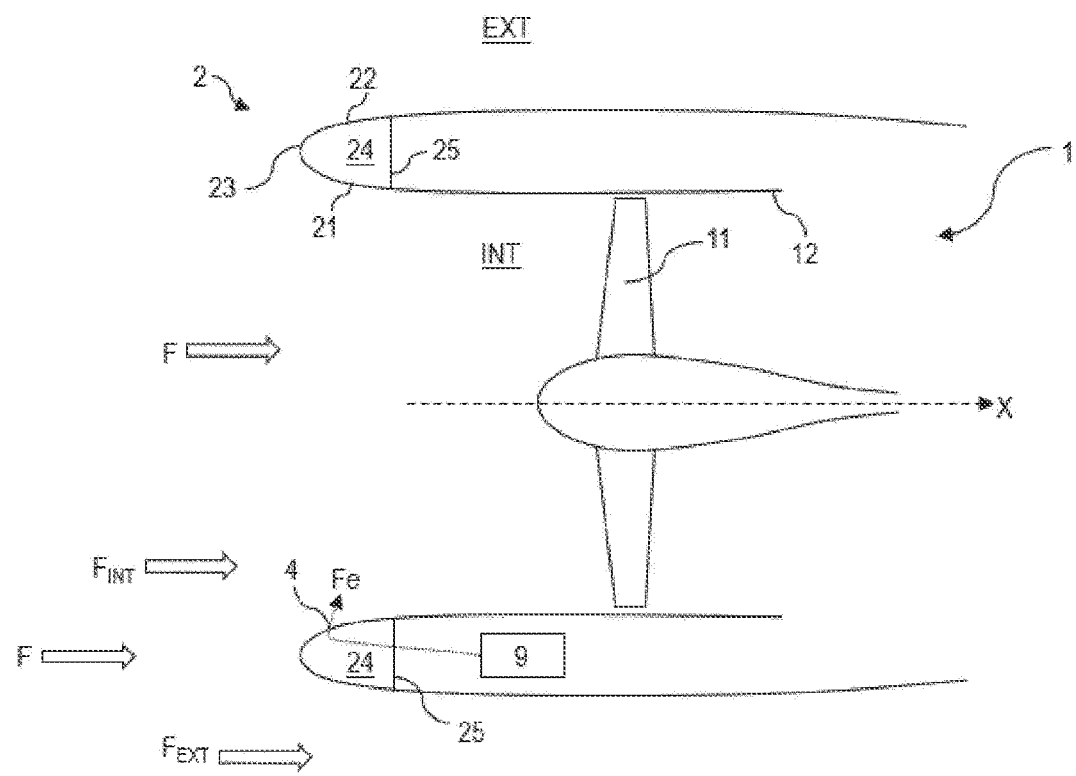
FIG. 2 is a schematic representation in a longitudinal cross-section view of an aircraft turbojet engine and air intake according to one embodiment of the invention.

With reference to FIG. 2, a turbojet engine 1 extending along an axis X and comprising a fan 11 rotatably mounted about axis X in an external shell 12 in order to accelerate an air flow F from upstream to downstream is represented. Hereafter, the terms upstream and downstream are defined in relation to the circulation of the air flow F. The turbojet engine 1 comprises, at its upstream end, an air intake 2 comprising an internal wall 21 pointing to axis X and an external wall 22 which is opposite to the internal wall 21, the walls 21, 22 are connected by a leading edge 23 known to those skilled in the art under the designation of "lip". The air intake 2 further comprises a front internal wall 25 so as to delimit an annular cavity 24 known to those skilled in the art as "D-Duct".

Thus, the air intake 2 allows the incoming air flow F to be separated into an internal air flow $F_{INT}$ guided by the internal wall 21 and an external air flow $F_{EXT}$ guided by the external wall 22.

Hereafter, the terms internal and external are defined radially with respect to axis X of the turbojet engine 1.

In a known way, during the flight of an aircraft, due to the temperature and pressure conditions, ice is likely to accumulate at the internal wall 21 and the leading edge 23 of the air intake 2 and to form ice blocks which are likely to be ingested by the turbojet engine 1. Such ingestions have to be avoided in order to improve the life time of the turbojet engine and to reduce malfunctions.

With reference to FIG. 2, the air intake 2 comprises a hot air source 9 mounted in the annular cavity 24. The hot air source 9 is preferably in the form of a hot air supply from the turbojet engine 1, which can be a piccolo tube or a circular air flow generated by a nozzle known as a "swirl", in order to provide a pressurized hot air flow at a temperature of about 250° C. Such a hot air source 9 is known from prior art and will not be set forth in more detail.

Figure 3:
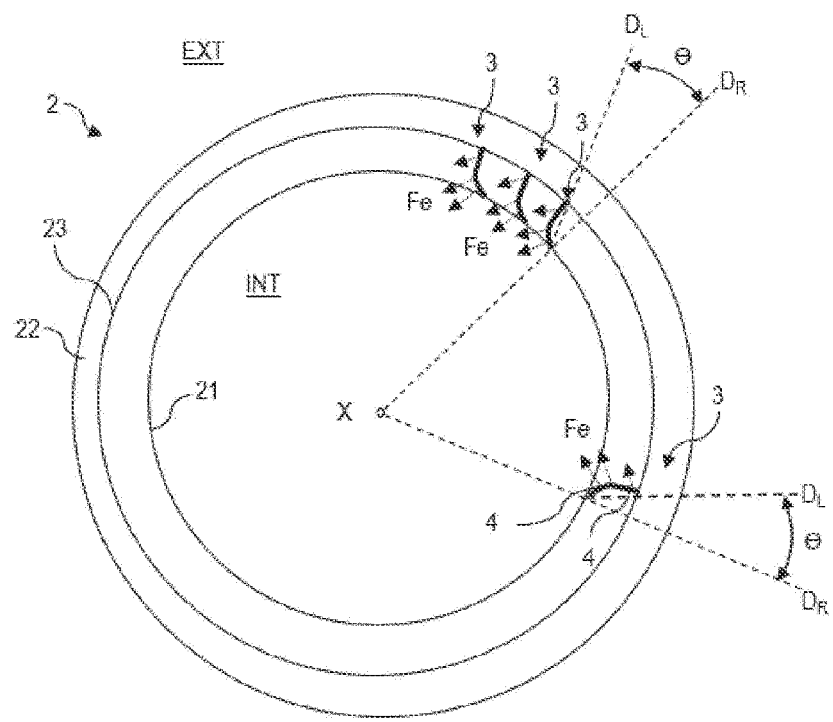
FIG. 3 is a front view of an air intake according to one embodiment of the invention.
Figure 4:
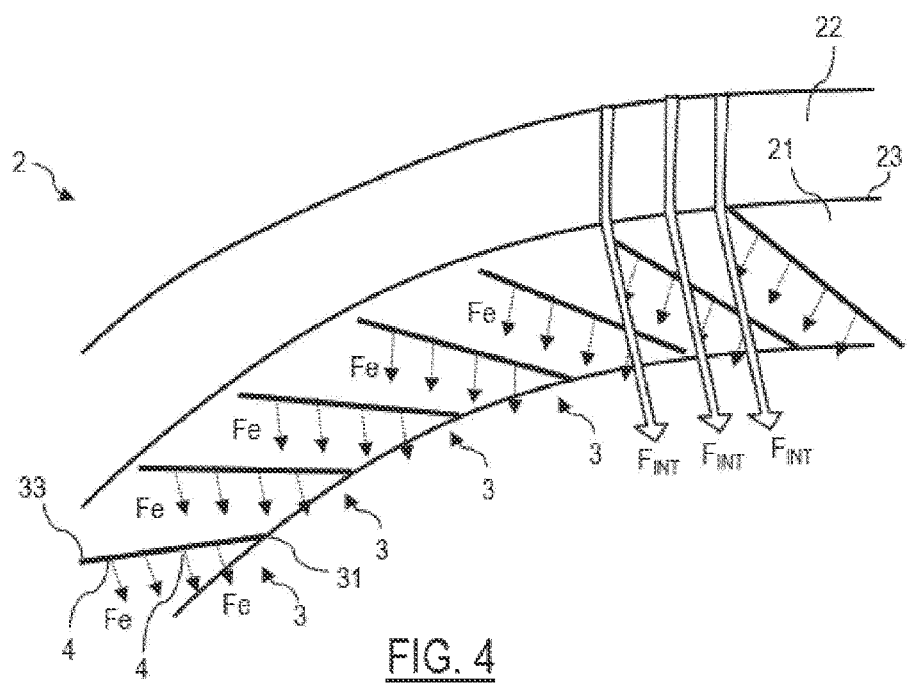
FIG. 4 is a close-up view of the air intake of FIG. 3.

In order to allow an optimal de-icing, as illustrated in FIGS. 3 to 4, the internal wall 21 comprises a plurality of blowing lines 3, each blowing line 3 comprising a plurality of through openings 4 configured to blow respectively elementary flows Fe coming from the hot air source 9 in order to de-ice said internal wall 21.

Such elementary flows Fe are advantageous given that they make it possible, on the one hand, to blow off ice particles directly accumulated on the through openings 4 and, on the other hand, to heat the internal wall 21 upon circulating the elementary flow Fe after it is ejected from a through opening 4.

In particular, an elementary flow Fe makes it possible to heat a portion of the internal wall 21 which is located downstream of the through opening 4 from which it is ejected. Indeed, the internal air flow $F_{INT}$ circulating in the turbojet engine 1 drives each elementary flow Fe along an axial direction X downstream, called a streamline. Advantageously, the elementary flow Fe makes it possible to distribute heat to the internal wall 21 as it circulates downstream, thus avoiding any ice accumulation. The de-icing is thus global even if the through openings 4 are few.

Figure 6A:
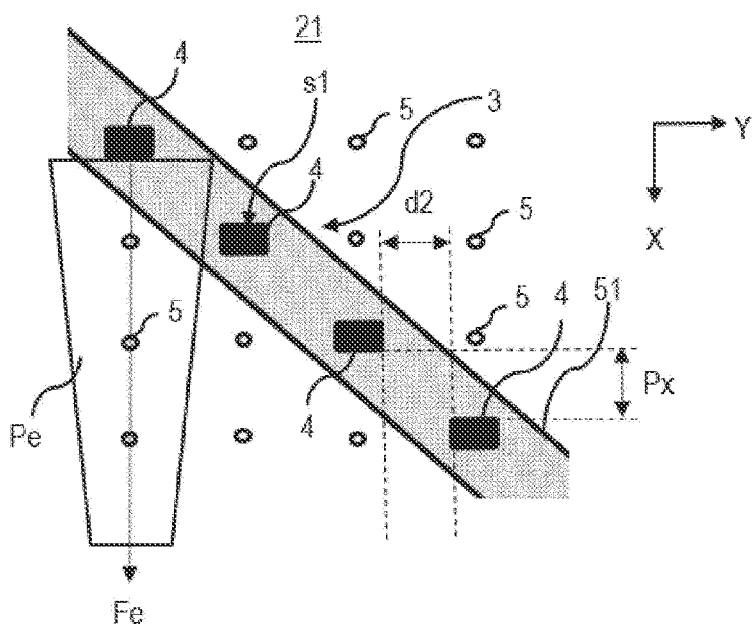
FIG. 6A is a close-up view of the through openings of a blowing line in FIG. 5 and the acoustic attenuation ports.
Figure 6B:
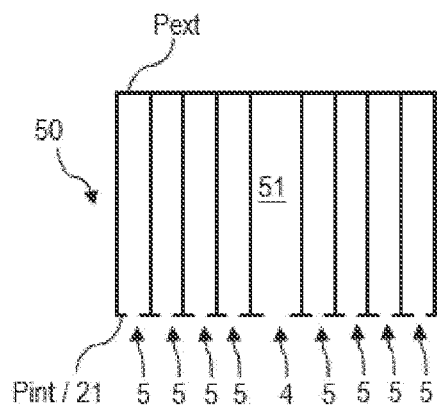
FIG. 6B is a radial cross-section view with respect to axis X of an internal wall.

Preferably, the internal wall 21 can comprise, outside the blowing lines 3, acoustic treatment zones. The acoustic treatment zones preferably comprise a noise-reducing honeycomb structure 50 as illustrated in FIG. 6B. In a known manner, the honeycomb structure 50 thus has an internal skin Pint and an external skin Pext, spaced apart from each other, so as to form cells, especially of the Helmholtz type. In a known manner, the internal skin Pint of the honeycomb structure 50 belongs to the internal wall 21 of the air intake 2.

Preferably, the internal wall 21, that is, the internal skin Pint of the honeycomb structure 50, comprises a plurality of acoustic attenuation ports 5 allowing acoustic waves to enter the cells of the honeycomb structure 50 to allow their attenuation. With reference to FIG. 6A, an internal wall 21 is represented with through openings 4 for blowing and through holes 5 for acoustic attenuation. Preferably, as illustrated in FIG. 6B, the cells are blind, that is, have only a single port 5, in order to provide optimal acoustic attenuation. Preferably, the blowing lines 3 are in the form of channels 51 formed in the honeycomb structure 50 that allow hot air to be conducted and elementary flows Fe to be blown via the through openings 4. Thus, the de-icing is carried out by blowing but also by thermal conduction.

An acoustic attenuation port 5 thus has a different function from a through opening 4 intended for blowing. Such a difference in function is further reflected in structural differences. An acoustic attenuation port 5 has a reduced diameter, preferably less than 0.5 mm, in comparison with a through opening 4 (set forth later).

Preferably, the acoustic attenuation ports 5 are distributed on the internal wall 21 outside the through openings 4 in order to maximize the acoustic treatment performance.

To improve the de-icing performance, it is preferable to increase the dimension and number of through openings 4. However, the larger the dimension and number of through openings 4, the smaller the number of acoustic attenuation ports 5 and the lower the acoustic treatment performance. Furthermore, the hot air consumption also increases, which is detrimental to the performance of the turbojet engine 1. Making through openings 4 is thus the result of a compromise, as will be set forth in the following.

As schematically illustrated in FIGS. 2 to 4, the internal wall 21 of the air intake 2 is not cylindrical, that is located at the same radial distance from axis X, but curved for aerodynamic reasons. Also, for the sake of clarity and brevity, the internal wall 21 will be set forth in a cylindrical projection plane P, that is located at a same radial distance from axis X, in order to define the geometrical characteristics of the blowing lines 3.

Figure 5:
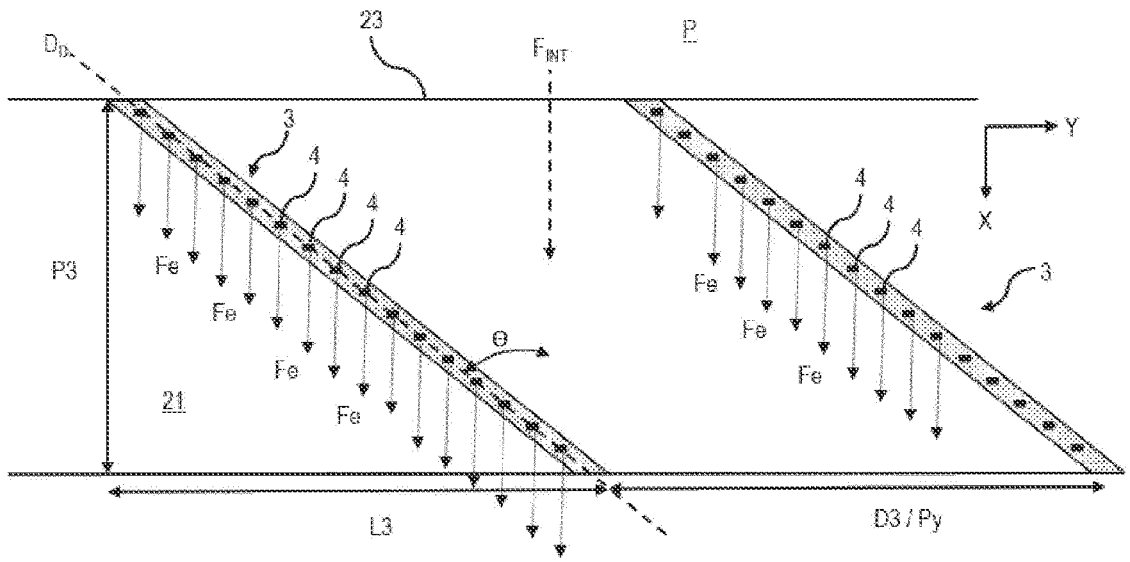
FIG. 5 is a cylindrical projection of the internal wall of the air intake with two non-overlapping blowing lines.

With reference to FIG. 5, the cylindrical projection plane P is defined in an orthogonal reference frame in which axis X is the axis of the turbojet engine 1 and axis Y corresponds to the angular opening and ranges from −180° to +180°.

According to the invention, with reference to FIG. 5, the blowing lines 3 are parallel to each other in the cylindrical projection plane P. Each blowing line 3 is spaced apart by a tilt angle θ with respect to axis X in the cylindrical projection plane P, the tilt angle θ being between 20° and 70°. Thus, as illustrated in FIG. 5, due to the tilt angle θ, an elementary flow Fe from a through opening 4 does not circulate over another through opening 4 during its downstream circulation along axis X. This advantageously avoids any loss of efficiency due to overlapping caused by multiple blowing at the same radial distance from axis X. The heating efficiency by the elementary flows Fe is improved given that all portions of the internal wall 21 located downstream of the through openings 4 are heated. As will be set forth later, even if the through openings 4 are distinct from each other, the elementary flows Fe allow the internal wall 21 to be heated by convection but also by conduction in order to avoid any ice appearance.

The tilt angle θ results from a compromise between the de-icing efficiency and the efficiency of the acoustic attenuation 4. A tilt angle θ, between 35° and 55°, ensures the best compromise.

Thereafter, with reference to FIG. 5, each blowing line has a depth defined along axis X designated as P3 and a length defined along axis Y designated as L3.

Preferably, the depth P3 corresponds to the total depth of the internal wall 21 of the air intake 2. The length L3 can be derived from the depth P3 and the tilt angle θ by the following trigonometric formula: $\cos\theta = P3/L3$ Preferably, with reference to FIG. 5, in order to ensure a homogeneous de-icing of the internal wall 21, two adjacent blowing lines 3 are spaced apart by the same spacing distance D3 defined along axis Y.

Preferably, each blowing line 3 has at least 5 through openings 4, preferably at least 10 through openings 4, more preferably at least 15 through openings 4. A large number of through openings 4 allows the distance ratio L3/D3, which is not relevant for a small number of through openings 4 per line, for example 2 or 3, to be precisely defined.

A large number of through openings 4 furthermore allows optimal de-icing of a turbojet engine, in particular, with a fan diameter between 1000 mm and 3000 mm. Preferably, the depth P3 ranges from 120 mm to 350 mm.

According to the invention, the distance ratio L3/D3 is between 1 and 2, preferably between 1 and 1.5, so as to allow uniform de-icing of the air intake while limiting overlapping of the blowing lines 3 along direction Y in order to avoid through openings 4 being aligned along axis X, which would be detrimental to the de-icing performance.

Blowing lines 3 which are rectilinear are represented in FIG. 5, but it goes without saying that they could be curved.

With reference to FIG. 6A, a blowing line 3 is represented in a close-up manner. Preferably, each blowing line 3 has a plurality of through openings 4. Preferably, each through opening 4 emits an elementary flow Fe of hot air that circulates downstream due to the internal air flow $F_{INT}$. In practice, each elementary flow Fe allows an elementary portion Pe of the internal wall downstream of the through opening 4 and which is a function of the distance to the through opening 4 to be heated by convection and conduction.

Preferably, each through opening 4 has a cross-section area s1 greater than 3 mm$^2$ so as to optimally de-ice. Preferably, the cross-section area s1 is between 3 mm$^2$ and 6 mm$^2$ so as to ensure a compromise between optimal de-icing and limited hot air consumption.

Preferably, two through openings 4 are spaced apart by the same distance d2, preferably between 1 and 2.5 the diameter of a through opening. A density of through openings 4 along axis Y, between 25% and 50%, ensures a compromise between de-icing performance and acoustic attenuation. Preferably, the density of through openings 4 is substantially constant along direction Y. By substantially constant, it is meant a local variation of less than 10% with respect to the average density.

With reference to FIG. 6A, the through openings 4 of a same blowing line 3 are spaced apart by a first pitch Px along axis X. The through openings 4 at a same longitudinal position along axis X are spaced apart by a second pitch Py along axis Y according to the following relationship: Py=Px*α with α a constant greater than 2, preferably greater than 5, more preferably greater than 10. In this example, the second pitch Py corresponds to the distance D3.

Indeed, as illustrated in FIG. 5, the through openings 4 are irregularly distributed, which is contrary to prior art which aimed at a regular and homogeneous distribution.

Figure 7:
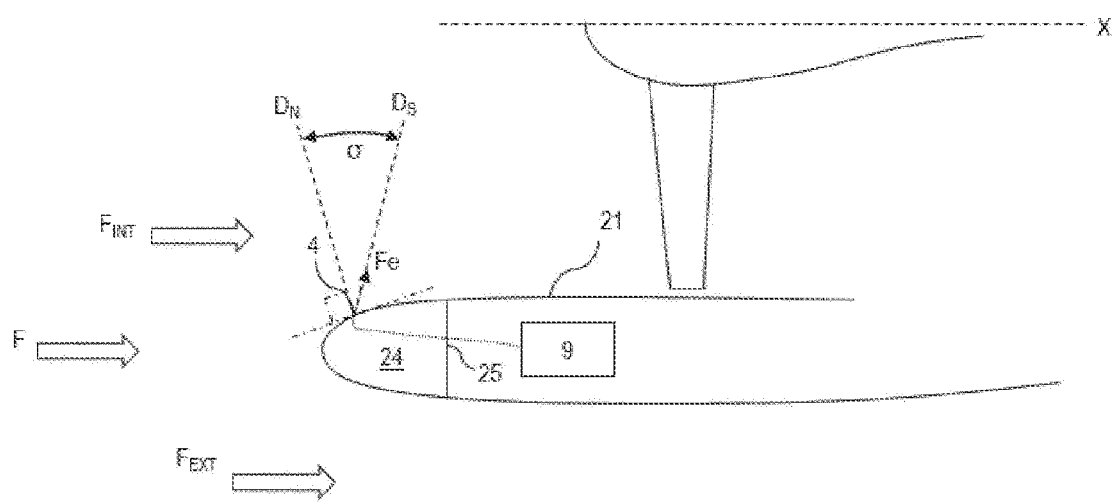
FIG. 7 is an axial cross-section view of an air intake in an overlapping zone of the blowing lines.

Referring henceforth to FIG. 7, each through opening 4 comprises an emission axis Ds that extends substantially along axis $D_N$ normal to the internal wall 21 in which the through opening 4 is locally formed. Preferably, the emission axis Ds is tilted downstream with respect to the normal axis $D_N$ by a blowing angle σ. Preferably, better de-icing performance is achieved with a blowing angle σ between 0° and 30°.

In this exemplary embodiment, rectangular through openings 4 have been schematically represented, but it goes without saying that other shapes could be suitable, especially slots, circular openings or any other calibrated opening.

As previously explained, each through opening 4 has a passage cross-section area greater than or equal to 3 mm$^2$ so as to provide an effective elementary flow Fe. Such a through opening 4 is advantageously distinguished from an acoustic attenuation port 5, the diameter of which is less than 0.5 mm.

Figure 8:
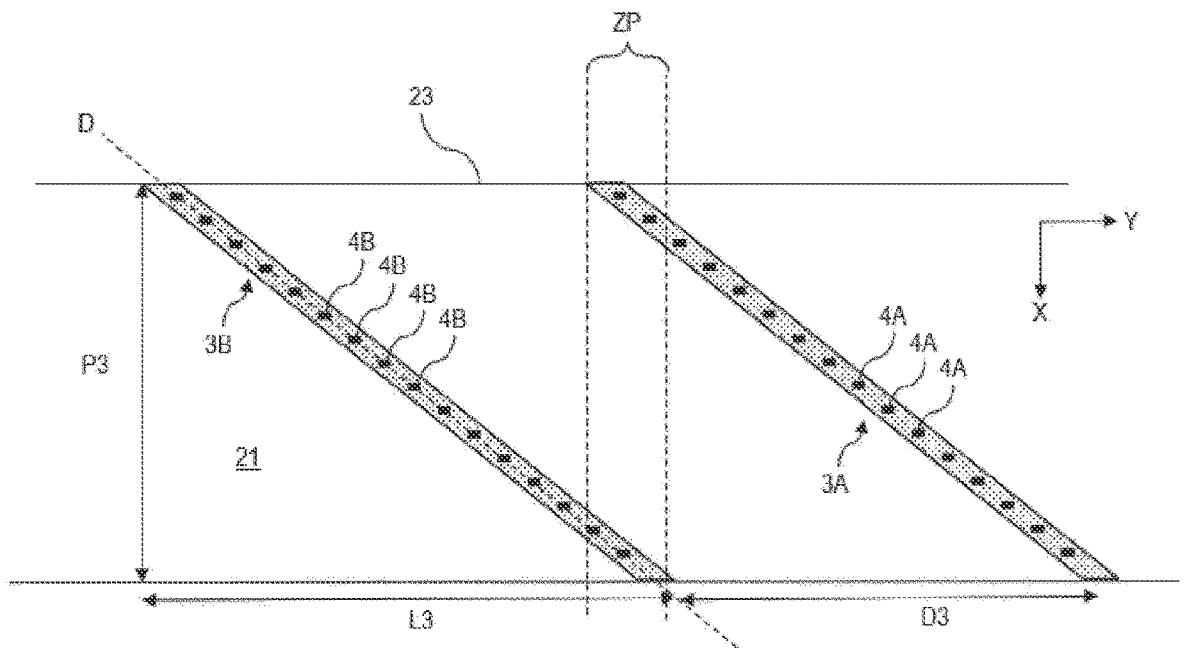
FIG. 8 is a cylindrical projection of the internal wall of the air intake with two overlapping blowing lines.
Figure 9:
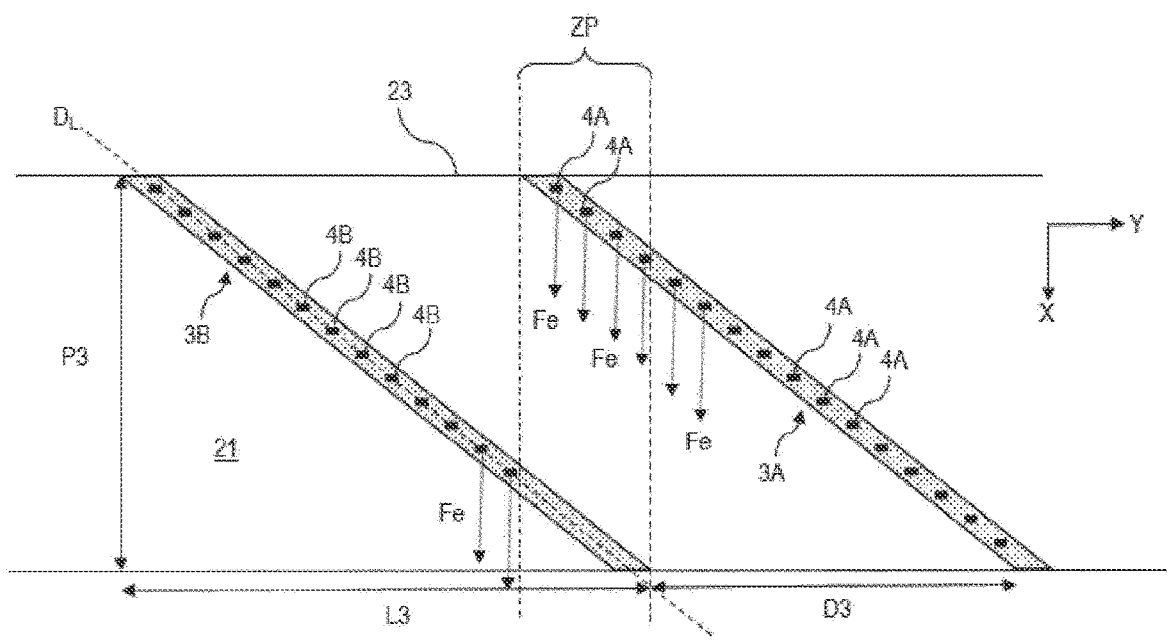
FIG. 9 is a cylindrical projection of the internal wall of the air intake with two overlapping blowing lines, one blowing line not comprising through openings in the overlapping zone.
Figure 10:
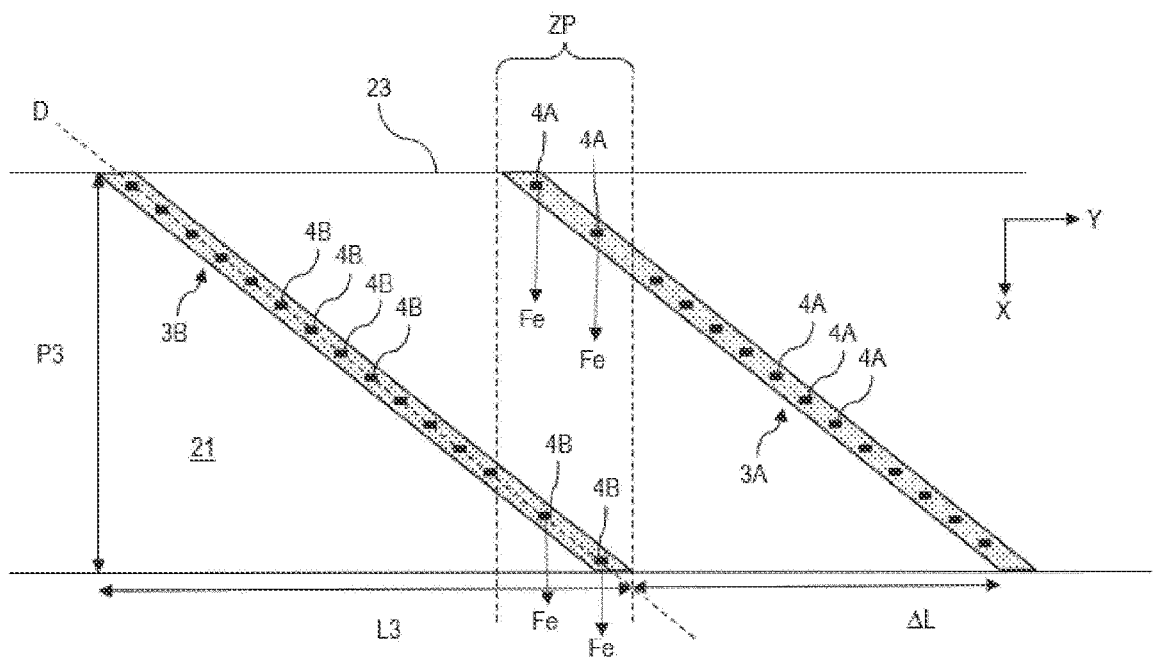
FIG. 10 is a projection of another embodiment of an internal wall of the air intake with two overlapping blowing lines, with the through openings of the blowing lines alternating between the blowing lines in the overlapping zone.

According to one aspect of the invention, with reference to FIGS. 8 to 10, the spacing distance D3 is less than the length L3 and this results in the blowing lines 3 overlapping along axis Y, that is, by projection along axis X onto axis Y. Preferably, the ratio L3/D3 is less than 2, preferably 1.5, in order to avoid the formation of excessively de-iced angular portion and the loss of acoustically treated surface. Subsequently, an overlapping zone ZP of length ZP3 equal to L3-D3 is defined. An overlapping zone ZP comprises, by definition, at least one part of an upstream blowing line 3A and at least one part of a downstream blowing line 3B as illustrated in FIGS. 8 to 10.

In this first example, with reference to FIG. 8, each blowing line 3A, 3B comprises through openings 4A, 4B. Preferably, the length ZP3 of the overlapping zone ZP is reduced so as not to be detrimental to the performance by aligning the through openings 4 along axis X. Such an embodiment allows to maximize the de-icing performance by multiplying the elementary flows Fe. Thereby, in this embodiment, the density of through openings 4 is greater in an overlapping zone ZP.

According to an alternative embodiment, with reference to FIG. 9, only the part of upstream blowing line 3A in the overlapping zone ZP has through openings 4A, the part of downstream blowing line 3B in the overlapping zone ZP does not comprise through openings. Thus, only the upstream blowing line 3A participates in de-icing the overlapping zone ZP, which allows the consumption of hot air for de-icing to be limited. Thereby, in this embodiment, the angular density of through openings 4 is constant both inside and outside an overlapping zone ZP.

According to another alternative embodiment, with reference to FIG. 10, each part of blowing line 3A, 3B belonging to the overlapping zone ZP comprises through openings 4A, 4B. Nevertheless, along direction Y, the through openings 4A, 4B are alternating so as to maintain a constant density of through openings 4 both inside and outside an overlapping zone ZP. The de-icing performance is thus optimized and the de-icing is distributed into the upstream blowing line 3A and the downstream blowing line 3B.

Preferably, an overlapping zone ZP comprises no more than two blowing lines 3 in order to allow for maximizing acoustic attenuation.

It has been previously set forth with reference to FIG. 5 an internal wall 21 comprising a plurality of blowing lines 3 that are parallel to each other in the cylindrical projection plane P and with each blowing line 3 being spaced apart by a tilt angle θ with respect to axis X in the cylindrical projection plane P.

Figure 11:
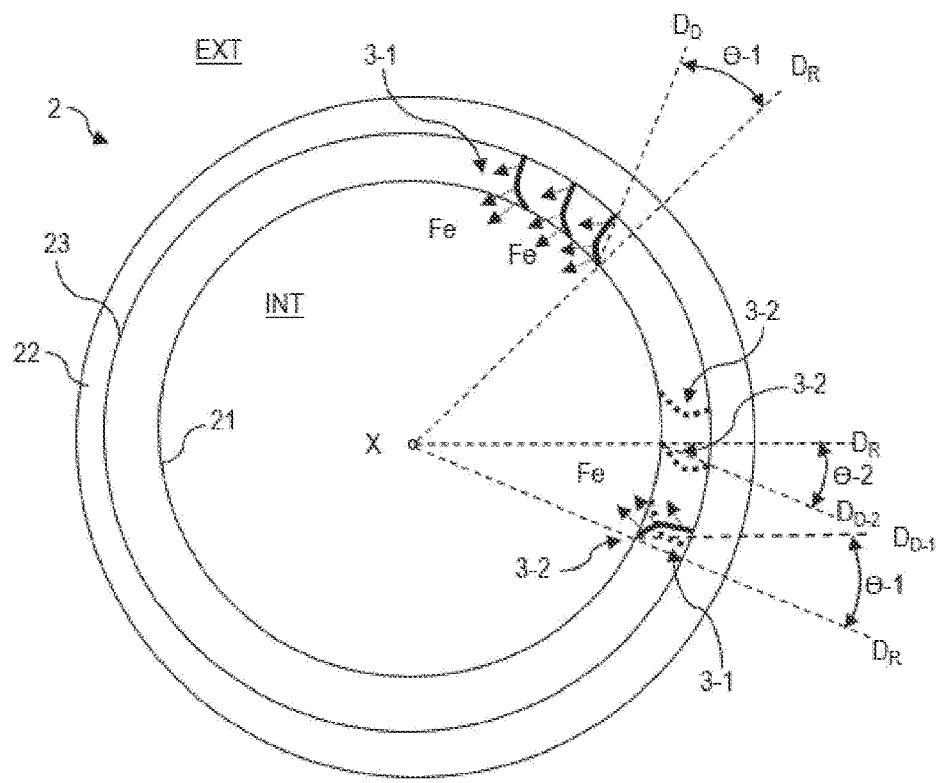
FIG. 11 is a front view of an air intake according to another embodiment of the invention comprising two sets of blowing lines with different tilt angles and FIG. 12 is a close-up view of the air intake of FIG. 11.
Figure 12:
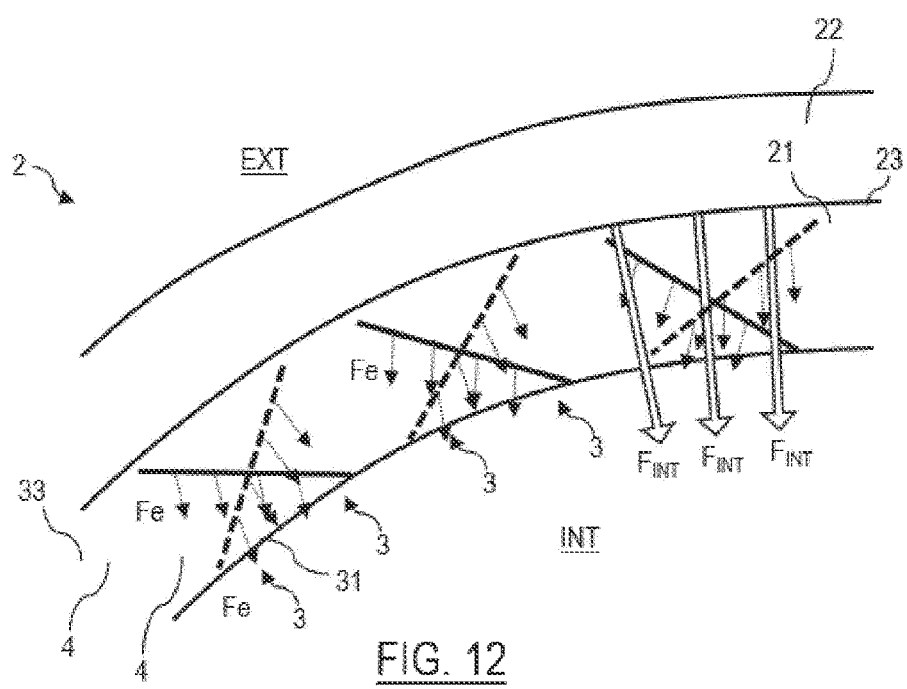

In another embodiment of the invention, with reference to FIGS. 11 and 12, the internal wall 21 comprises a first plurality of blowing lines 3-1 and a second plurality of blowing lines 3-2, each comprising through openings 4-1, 4-2. Preferably, each first blowing line 3-1 is spaced apart by a first tilt angle θ-1 with respect to axis X in the cylindrical projection plane P while each second blowing line 3-2 is spaced apart by a second tilt angle θ-2 with respect to axis X in the cylindrical projection plane P.

In this exemplary embodiment, the first tilt angle θ-1 and the second tilt angle θ-2 have different signs so as to provide different de-icing. The use of two pluralities of blowing lines 3-1, 3-2 allows a synergic de-icing between the elementary flows Fe coming from the different pluralities of blowing lines 3-1, 3-2. It goes without saying that the internal wall 21 could comprise more than two pluralities of blowing lines 3-1, 3-2.

In operation, the hot air source 9 feeds the blowing lines 3 which allow for conductive heating of the internal wall 21 as the hot air flows through the conduction channels 51 of the honeycomb structure 50 the blowing lines 3 of which have the shape. Furthermore, the hot air source 9 feeds the through openings 4 of the blowing lines 3 which allow for conductive heating. As these are distributed around the periphery of the internal wall 21, de-icing is carried out evenly. The tilt of the blowing lines 3 as well as the judicious spacing of the blowing lines 3 between them avoids that numerous through openings 4 are aligned along axis X which would be detrimental to the de-icing performance. Thus, each through opening 4 emits an elementary flow Fe of hot air which is guided along axis X by the internal air flow $F_{INT}$ of the turbojet engine 1 in order to de-ice, by convection and conduction, a portion of the internal wall located downstream of the through opening 4.

Any streamline thus intercepts at least one blowing line 3, which allows optimal de-icing even if the number of blowing lines 3 is reduced. Unlike prior art, which taught uniform heating, only a few local blowing lines 3 allow for overall de-icing. The spacing of the blowing lines 3 is advantageous given that it allows any accumulated ice to be made liquid without allowing it to be converted back into ice as it circulates downstream.

The invention claimed is:

1. An air intake of a turbojet engine nacelle of an aircraft comprising a de-icing device and extending along an axis X in which an air flow circulates from upstream to downstream, the air intake annularly extending about axis X and comprising an internal wall facing the axis X and an external wall which is opposite to the internal wall, the internal and external walls being connected by a leading edge and a front internal partition wall located inside the internal and external walls to delimit an annular cavity, the de-icing device comprising:

at least one hot air source in the annular cavity,
the internal wall, at an area upstream of the front internal partition wall, comprises a plurality of blowing lines,
the internal wall comprises at least one acoustic attenuation structure comprising a plurality of acoustic attenuation ports,
the acoustic attenuation ports being distributed on the internal wall outside the blowing lines and not configured to blow hot air,
each blowing line comprising a plurality of through openings configured to blow elementary flows coming from the at least one hot air source to de-ice said internal wall,
the plurality of blowing lines being parallel to each other in a cylindrical projection plane defined with respect to the axis X of the turbojet engine and to an axis Y defining the angular position with respect to the axis X,
each blowing line having a depth P3 defined along the axis X and a length L3 defined along the axis Y in the cylindrical projection plane,
two adjacent blowing lines being spaced apart by a distance D3 along the axis Y,
a distance ratio L3/D3 being between 1 and 2; and
wherein each blowing line is spaced by a tilt angle with respect to the axis X in the cylindrical projection plane, the tilt angle is between 20° and 70°.

2. The air intake according to claim 1, wherein the internal wall comprises at least one overlapping zone ZP in which adjacent blowing lines overlap, the overlapping zone ZP comprising at least an upstream blowing line and a downstream blowing line.

3. The air intake according to claim 2, wherein the downstream blowing line is free of through openings in the overlapping zone ZP.

4. The air intake according to claim 2, wherein the through openings are alternating along direction Y between the upstream blowing line and the downstream blowing line.

5. The air intake according to claim 1, wherein, a density of through openings of each blowing line is constant along direction Y.

6. The air intake according to claim 1, further comprising a honeycomb structure, wherein the honeycomb structure defines acoustic cells and each acoustic cell comprising acoustic attenuation ports and circulation channels forming the blowing lines comprising the through openings for blowing.

7. The air intake according to claim 1, wherein each through opening has a cross-sectional area greater than 3 mm².

8. The air intake according to claim 1, wherein each acoustic attenuation port has a diameter of less than 0.5 mm.

9. The air intake according to claim 1, wherein the through openings are irregularly distributed along axis X and along axis Y in the cylindrical projection plane.

10. The air intake according to claim 1, wherein each blowing line comprises at least 5, 10, or 15 through openings.

11. A method for de-icing the air intake of the turbojet engine nacelle of the aircraft according to claim 1, the method comprising a step of blowing a plurality of elementary flows from the hot air source through the through openings of the blowing lines to de-ice the internal wall.

* * * * *